May 30, 1961
L. O. BORKE
2,986,254
WORK POSITION SENSING MEANS WHICH RENDERS
TOOL INOPERATIVE IN THE EVENT OF
IMPROPERLY POSITIONED WORK
Filed April 29, 1957
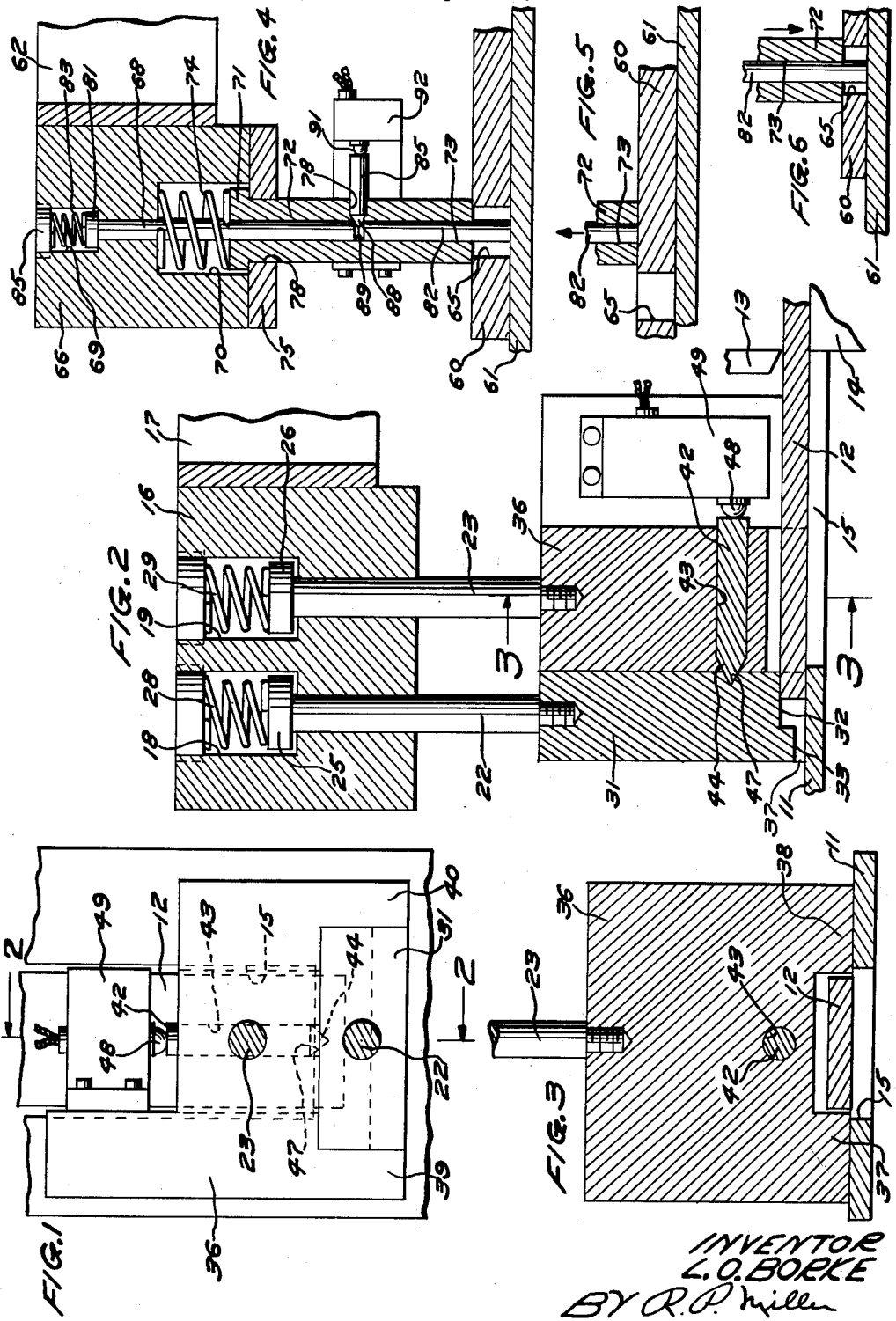
INVENTOR
L. O. BORKE
BY R. P. Miller
ATTORNEY United States Patent Office 2,986,254
Patented May 30, 1961

2,986,254
WORK POSITION SENSING MEANS WHICH RENDERS TOOL INOPERATIVE IN THE EVENT OF IMPROPERLY POSITIONED WORK

Lars O. Borke, Oak Park, Ill., assignor to Western Electric Company, Incorporated, New York, N.Y., a corporation of New York Filed Apr. 29, 1957, Ser. No. 655,899

15 Claims. (Cl. 192—125)

This invention relates to safety devices for checking the position of stock in a work position and more particularly to detecting apparatus for rendering a machine inoperative when stock to be fabricated is improperly positioned or is too wide or of an undesirable thickness.

In fabricating machines it is important that stock to be fabricated is properly positioned and that stock is of prescribed dimensions. If these conditions are not met, the parts will not be properly fabricated. This results in wasted material and time. With this problem in mind, one of the prime objects of this invention is to provide a new and novel device for rendering a fabricating machine inoperative if the stock to be fabricated is not fed into a predetermined position.

Another object of this invention is to provide a device for rendering a stock fabricating machine inoperative if the stock is not of a predetermined dimension.

A further object of this invention is to provide a stock fabricating machine control device having a pair of movable members for engaging the stock and a bed of the machine to determine whether the stock is properly positioned.

A still further object of this invention is to provide a stock fabricating machine control device having a pair of members which move to cover the end of the stock and which are moved relative to each other to render the machine inoperative if the stock is improperly positioned or of an undesirable thickness.

With these objects in mind, one embodiment of the invention contemplates, in a machine for cutting portions of a predetermined length off the end of a strip as it is intermittently advanced to a cutting tool, a pair of feeler members moved in advance of a fabricating tool and which are normally held against relative movement. A pin engaging a spring loaded actuator of a switch is mounted in one member and enters an indentation in the other. One of the members engages the stock and the other straddles the stock to engage a bed of the machine. If the stock is improperly positioned or of an improper thickness, there is relative movement between the members and the pin is cammed out of the indentation to open the switch, which controls the machine.

Other objects and advantages of the invention will become apparent by reference to the following detailed description and the accompanying drawing illustrating a preferred embodiment of the invention, in which Fig. 1 is a fragmentary plan view of a device for ascertaining the position of stock material embodying the principles of the invention;

Fig. 2 is a fragmentary cross-sectional view taken on line 2—2 of Fig. 1 showing the relationship of a pair of feeler members in actuated position;

Fig. 3 is a fragmentary cross-sectional view taken along line 3—3 of Fig. 2 illustrating the manner in which one of the feeler members straddles stock and engages a bed of a fabricating machine;

Fig. 4 is a vertical fragmentary cross-sectional view of a second embodiment of the invention depicting a pair of feeler elements engaging a properly positioned strip of stock;

Fig. 5 is a fragmentary view of the disclosure of Fig. 4 with the stock improperly positioned; and Fig. 6 is the disclosure of Fig. 5 with a strip stock of improper thickness.

Referring now in detail to the drawing, a bed 11 of a fabricating machine (not shown) is shown supporting a strip of stock 12 which is intermittently advanced along the bed by a feed mechanism (not shown) of a well-known type. A shearing blade 13 (Fig. 2) is moved into cooperation with a fixed die 14 secured to the bed 11 to cut a portion from the end of the stock 12. The severed portions drop through an aperture 15 in the bed 11 into a container (not shown). A projection 17 (Fig. 2) of a ram (not shown) carrying the blade 13 supports a block 16 having counterbored holes 18 and 19 (Fig. 2). A pair of rods 22 and 23, slidably mounted in the holes 18 and 19, respectively, are provided with enlarged heads 25 and 26 which engage the bottoms of the counterbored portions of the holes 18 and 19, respectively, to limit downward movement of the rods 22 and 23 relative to the block 16. Compression springs 28 and 29 mounted in the counterbored portions of the holes 18 and 19 engage the enlarged heads 25 and 26 to hold the rods 22 and 23 in their lowermost positions in the block 16.

A block-like first feeler or work locating member 31 carried by the rod 22 is provided with a surface 32 (Fig. 2) for engaging the upper surface of the stock 12 when it is advanced to the proper fabricating position and a flange 33 which extends downward past the surface 32 for engaging the stock 12 when it is advanced too far. A block-like second feeler or work locating member 36 carried by the rod 23 is provided with a pair of spaced lugs 37 and 38 (Fig. 3) which depend on opposite sides of the stock 12 and engage the bed 11 when in a lowered position. Projections 39 and 40 (Fig. 1) on the member 36 extend past the first member 31 on opposite sides to hold it in alignment with the second member 36. If the stock 12 is displaced transversely from its proper path of travel, it will be engaged by one of the lugs 37 and 38 when the blade 13 is lowered, thereby stopping the downward movement of the feeler member 36.

A pin 42 mounted in a bore 43 in the second feeler member 36 is provided with a conical end 44 normally positioned in an indentation 47 in the first feeler member 31. The other end of the pin 42 engages a spring loaded actuator 48 of a limit switch 49 of a well-known type secured to the second feeler member 36 and electrically connected to a motor (not shown) driving the feed mechanism and the ram. Upon relative movement between the first and second feeler or work locating members 31 and 36, the conical end 44 of the pin 42 is forced out of the indentation 47 in the first feeler member 31 to open the switch 49 and disconnect the motor from its power supply. If the stock 12 is of the proper thickness and is fed into the proper position, there is no relative movement between the feeler members 31 and 36, and the switch 49 remains closed.

In operation of the device, the stock 12 is advanced into fabricating position and the ram is then moved to carry the feeler members 31 and 36 and the blade 13 downward, the feeler members moving in advance of the blade 13. If the stock 12 is properly positioned, the feeler members 31 and 36 stop in the positions best illustrated in Fig. 2 and the blade 13 continues further downward to shear the stock 12, the springs 28 and 29 being compressed during the further downward movement of the blade 13.

If the stock 12 is fed too far it engages the flange 33 and stops the first feeler member 31 short of its normal lowered position (Fig. 2) and the second feeler member 36 continues downward, whereupon the pin 42 is cammed out of the indentation 47 in the first feeler member 31 and the switch 49 is opened. If the stock 12 is not fed far enough, the first feeler member 31 misses it entirely and continues downward after the second feeler member 36 is stopped by engagement of the lugs 37 and 38 with the bed 11, whereupon the pin 42 is moved to open the switch 49. If the stock 12 is displaced laterally from its direction of feed, one of the lugs 37 or 38 will engage it and stop the second feeler member. As the first feeler member 31 continues downward after the second feeler member 36 is stopped, the pin 42 is moved to open the switch 49. The opening of the switch 49 renders the ram and the feed mechanism inoperative by disconnecting the motor from the power supply.

In a second embodiment of the invention strip stock 60 is intermittently fed along a bed 61 of a fabricating machine (not shown) by a feed mechanism (not shown) of a well-known type. A tool (not shown) is moved downward by a ram 62 to fabricate the stock 60 each time it is advanced. The stock 60 is provided with a plurality of holes 65 at spaced intervals equal to the distance the stock is fed each time the feed mechanism is actuated.

A block 66 (Fig. 4) secured to the ram 62 is provided with an aperture 68 having an upper counterbore 69 and a lower counterbore 70. An enlarged head 71 of a tubular feeler element 72 having an axial bore 73 is positioned in the lower counterbore 70 and is urged downward therein by a compression spring 74. A plate 75 (Fig. 4) having an aperture 78 through which the tubular feeler element 72 passes is secured to the lower surface of the block 66 to retain the enlarged head 71 therein.

An enlarged head 81 of a feeler element rod 82 is positioned in the upper counterbore 69 and is urged downward therein by a compression spring 83 held in the conuterbore 69 by a plug 85. The feeler element rod 82 extends downward through the aperture 68 in the block 66 and the bore 73 in the tubular feeler element 72. A pin 85 (Fig. 4) extends through a bore 86 in the tubular feeler element 72 and is provided with a conical end 88 which is normally positioned in a re-entrant groove 89 in the feeler element rod 82. The other end of the pin 85 engages an actuator 91 of a switch 92 electrically connected to a drive motor (not shown) of the feed mechanism and the fabricating machine. When one of the feeler elements 72 or 82 is moved relative to the other, the end 88 of the pin 85 is cammed out of the groove 89 to open the switch 92 and disable the feed mechanism and the fabricating machine by disconnecting the drive motor from its power supply.

The lengths of the feeler elements are such that when the ram 62 is lowered to fabricate properly positioned stock 60 of a proper preconcerted thickness, the tubular feeler element 72 engages the top surface of the stock 60 as the feeler element rod 82 engages the bed 61 of the machine whereby there is no relative movement between the feeler elements. If the stock 60 is not fed to the proper position or is not of a proper thickness, one of the feeler elements will be stopped above or below its normal lowermost position. This results in relative movement between the feeler elements 72 and 82 whereby the switch 92 is opened as above-described.

In operation of the second embodiment of the invention, stock 60 is advanced into fabricating position and the ram 62 is actuated to move the fabricating tool (not shown) downward. The feeler elements 72 and 82 move downward in advance of the tool. If the stock 60 is properly positioned and of a proper thickness, the tubular feeler element 72 is stopped by engagement with the stock 60 and the feeler element rod 82 passes through the hole 65 and is stopped by engagement with the bed 61, both feeler elements stopping simultaneously. If the stock 60 is not properly positioned or is of an improper thickness, the feeler elements 72 and 82 will not stop simultaneously and the end 88 of the pin 85 will be cammed out of the groove 89 to open the switch 92 and disable the feed mechanism and the fabricating machine.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a safety control device for a machine having a movable holder carrying a tool for fabricating stock moved into a predetermined work position on a bed of the machine, support means carried by the tool holder, first feeler means resiliently mounted on the support means for engaging properly positioned stock, second feeler means resiliently mounted on the support means separate of said first feeler means for engaging the bed of the machine closely adjacent properly positioned stock, said support means moving said first and second feeler means into contemporaneous engagement with said stock and bed, and means carried by one of the feeler means for rendering the machine inoperative in response to said first and second feeler means assuming relative positions dictated by improperly positioned stock.

2. In a safety control device for a machine having a movable holder carrying a tool for fabricating stock moved into work position on a bed of the machine, support means mounted on the tool holder, a first feeler member movably mounted on the support means for engaging properly positioned stock, a second feeler member movably mounted on the support means separate of said first feeler member for engaging the bed of the machine closely adjacent properly positioned stock, said support means moving said first and second feeler members into contemporaneous engagement with said stock and bed, and means carried by one of the feeler members and engaging the other feeler member for rendering the machine inoperative when said feeler members assume positions dictated by improperly positioned stock.

3. In a machine having a movable tool for fabricating stock positioned on a bed of the machine, detecting means for checking the position of the stock comprising a first feeler member carried with the tool for engaging properly positioned stock, a second feeler member carried with the tool separate from said first feeler member and having a pair of lugs for depending on opposite sides of the stock and engaging the bed of the machine when said stock is properly positioned, said stock and bed being engaged contemporaneously by the feeler members, and means carried by the second feeler member for rendering the machine inoperative when the relative positions of said feeler members are dictated by improperly positioned stock.

4. A safety device for a machine having a reciprocating holder carrying a tool to fabricate stock positioned on a bed of the machine, comprising support means carried by the tool holder, a first feeler member slidably mounted on the support means for engaging properly positioned stock, first resilient means on the support means for urging the first feeler member into a predetermined position on the support means, a second feeler member slidably mounted on the support means separate of said first feeler member for engaging the bed of the machine closely adjacent properly positioned stock, second resilient means on the support means for urging the second feeler member into a predetermined position on the support means, said support means moving said first and second feeler members into contemporaneous engagement with said stock and bed, and means on the second feeler member responsive to the relative positions of said feeler members for rendering the machine inoperative when said relative positions are dictated by improperly positioned stock.

5. A safety device for a machine having a reciprocating holder for carrying a tool to fabricate stock positioned on a bed of the machine, comprising a support member carried by the tool holder and having a pair of parallel vertical bores, a pair of rods mounted for limited movement in said pair of bores and extending downward therefrom, a pair of springs mounted in the bores to urge the rods into the lowermost positions in said bores, a first feeler member mounted on one of the rods for engaging properly positioned stock on the bed, a second feeler member mounted on the other rod for engaging the bed of the machine closely adjacent properly positioned stock, said support member moving said first and second feeler members into contemporaneous engagement with said stock and bed, and means carried by the second feeler member and responsive to the relative positions of said feeler members for rendering the machine inoperative when said relative positions are dictated by improperly positioned stock.

6. A safety device for a machine having a reciprocating holder for carrying a tool to fabricate stock intermittently advanced across a bed of the machine comprising a support member carried by the tool holder, a first feeler member carried by the support member and having a surface for engaging the stock when it is advanced to proper position and also having a depending flange for engaging the stock when it is advanced too far, a second feeler member carried by the support member separate of said first feeler member and having a pair of depending lugs for engaging the bed of the machine when the stock is properly positioned, said support member moving said first and second feeler members into contemporaneous engagement with said stock and bed, and means carried by the second feeler member for rendering the machine inoperative in response to the relative positions of said feeler members when said relative positions are dictated by improperly positioned stock.

7. A safety device for a machine having a tool carried by a reciprocating holder for fabricating stock intermittently advanced across a bed of the machine, comprising a block carried by the tool holder and having a pair of parallel apertures having counterbored upper portions, a pair of rods slidably positioned in the apertures and having enlarged heads positioned in said counterbored portions of the apertures, a pair of springs mounted in the counterbored portions of the apertures for urging the heads of the rods to their lowermost positions therein, a first feeler member secured to one of the rods and having a surface for engaging proconcerted positioned stock and a flange depending below said surface for engaging stock which is advanced past the preconcerted fabricating position, said first feeler member making no contact with stock which is not advanced to the said preconcerted fabricating position, a second feeler member secured to the other rod and having a pair of lugs depending on opposite sides of the preconcerted positioned stock to engage the bed of the machine, one of said lugs engaging the stock when it is laterally displaced from said preconcerted fabricating position, said block moving said first and second feeler members into contemporaneous engagement with said stock and bed, said second feeler member also having a horizontal bore, said first feeler member having a conical recess normally aligned with the bore in the second feeler member, a pin slidably mounted in the bore in said second feeler member and having a tapered end extending into the conical recess in the first feeler element, and a switch carried by the second feeler member and positioned to be opened by the pin in response to relative movement between the feeler members.

8. In a machine tool, apparatus for detecting the position of stock on the table of the machine tool and for interrupting operation of the machine tool in the event that the stock is improperly positioned, said apparatus comprising feeler members movable toward and away from said table, means including a movable base member for supporting said feeler members closely adjacent to each other and for moving said feeler members toward and away from said table, said supporting means permitting lost motion between each of said feeler members and said movable base member, one of said feeler members being arranged to have its movement toward said table interrupted according to one characteristic of the position of stock on the table, the other of said feeler members being arranged to have its movement toward said table interrupted according to another characteristic of the position of stock on the table, and a control element carried in one direction by one of said feeler members and movable in another direction by the other of said feeler members for interrupting machine operation when said feeler members assume relative positions dictated by improperly positioned stock.

9. Detecting and control apparatus as specified in claim 8 wherein said control element is mounted on said one feeler member and is movable with respect thereto in a direction generally perpendicular to the direction of movement of said one feeler member, and said second feeler member causes such relative movement of said element and said first feeler member in accordance with the relative position of said second feeler member with respect to said first feeler member.

10. Detecting and control apparatus as specified in claim 8 wherein each of the said feeler members is separately resiliently supported by said base member and is biased toward said table of said machine tool.

11. Detecting and control apparatus as specified in claim 10 wherein said control element permits machine operation to continue when the biasing means are allowed to move the feeler members toward said table of said machine tool to normal positions with respect to said base member.

12. Detecting and control apparatus as specified in claim 8 wherein said feeler members comprise a central pin member and an encircling annular member and wherein the movement of said pin member toward said table is interrupted according to the position of a recess in the stock, and the movement of the annular member toward said table is interrupted according to the presence and thickness of said stock.

13. Detecting and control apparatus as specified in claim 8 wherein one of said feeler members has a contact surface with a depending flange whereby the movement of said feeler member toward said table is interrupted according to the presence and thickness of the stock and the positioning of said stock in one direction.

14. Detecting and control apparatus as specified in claim 8 wherein one of said feeler members has spaced apart, coplanar feeler surfaces engageable with said table of said machine tool at opposite sides of and closely adjacent to properly positioned stock.

15. Detecting and control apparatus as specified in claim 8 wherein one of the said feeler members has a contact surface with a depending flange whereby the movement of said one feeler member toward said table is interrupted according to the presence and thickness of said stock and the positioning of said stock in one direction, and wherein the other of said feeler members has spaced apart, coplanar feeler surfaces engageable with said table of said machine tool at opposite sides of and closely adjacent to properly positioned stock, said other feeler member having its movement toward said table interrupted according to the positioning of said stock in a direction generally perpendicular to said first-mentioned direction.

References Cited in the file of this patent

UNITED STATES PATENTS

| | | |
|---|---|---|
| 1,772,540 | Fowler | Aug. 12, 1930 |
| 2,589,849 | Oetiker | Mar. 18, 1932 |
| 2,796,965 | Lamoureux | June 25, 1957 |
| 2,821,251 | Borke | Jan. 28, 1958 |